Oct. 7, 1941.   F. M. YOUNG   2,258,040

CUSHION SEAL BEARING

Filed Jan. 31, 1938

INVENTOR
FRED M. YOUNG
BY A.S.Kroh
ATTORNEY

Patented Oct. 7, 1941

2,258,040

UNITED STATES PATENT OFFICE 2,258,040

CUSHION SEAL BEARING

Fred M. Young, Racine, Wis.

Application January 31, 1938, Serial No. 187,822

1 Claim. (Cl. 308—26)

The present invention relates to bearings wherein the bearing sleeve is separated from its housing by means of a rubber band for the purpose of preventing vibrations from being transmitted from the shaft to the unit to which the bearing is secured.

The principal object of the present invention is to provide a self aligning bearing which is suitable for use on fan housings and air conditioning housings of various types and kinds whereby vibrations caused by the rotation of the shaft and by the action of the air on the rotor will not be transmitted to the bearing support which usually consists of thin metal panels which act as a sounding board.

I eliminate these undesirable vibrations by separating the bearing sleeve from the bearing housing by means of a rubber cushion band, the design being such as will form an air seal between the shaft and the housing to which the bearing is secured.

To these and other useful ends my invention consists of parts and combinations of parts or their equivalents as described and claimed and shown in the accompanying drawing in which:

Figure 1:
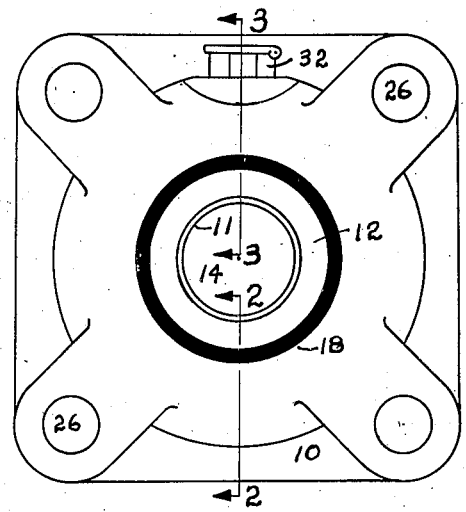
Fig. 1 is a front elevation illustrating a bearing equipped with my invention.

As thus illustrated, the bearing housing is designated by reference numeral 10. The bearing sleeve is designated by reference numeral 11 having a suitable carrying unit 12. Member 12 is provided with an annular chamber 13 which intersects member 11. Sleeve 11 is preferably made porous enough for the reception of a suitable quantity of oil to shaft 14. Sleeve 11, however, may be supplied with an orifice as at 15. In either event chamber 13 is adapted to carry a supply of oil. In which case chamber 13 will be filled with an oil absorbing material so an adequate quantity of oil will find its way into the bearing.

I provide a grooved outer surface 16 on member 12 which is spherically formed and terminates into flanges as at 17.

I provide a rubber band 18 which is adapted to fit snugly over surface 16 and between flanges 17 as illustrated. Member 10 on its forward inner portion is curved or counterbored as at 19 to register with member 18 as illustrated. The rear half of member 10 is chambered out as at 20, the chamber terminating as at 21.

Figure 2:
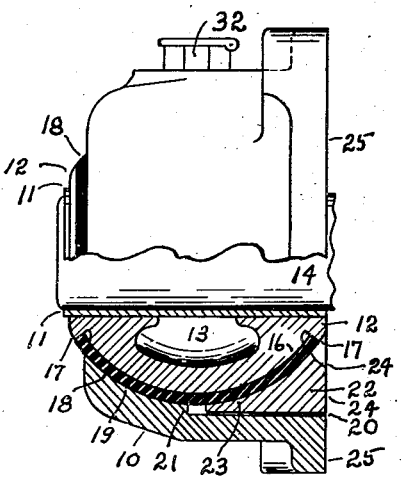
Fig. 2 is a side elevation partially in section of the device shown in Figure 1 taken on line 2—2.

I provide a sleeve 22 which is adapted to be slidably embraced by chamber 20, the inner surface being curved or counterbored as at 23 so as to register with band 18, sleeve 22 being of a length to thereby cooperate with surface 19 to tightly embrace band 18 when the rear surface 24 of the sleeve is flush with the rear surface 25 of housing 10 (see Figure 2).

Housing 10 is preferably provided with suitably positioned orifices 26 by means of which it may be secured to its supporting members or the panel of an air conditioning housing.

Thus it will be seen that when my improved bearing is positioned over the shaft end and before being secured to its supporting member, sleeve 22 will slightly protrude past surface 25. The bearing member will therefore be free to adapt itself to the shaft and then when member 10 is secured to its supporting member or panel, sleeve 22 will be forced into chamber 20 and against rubber band 18 so that the bearing sleeve will then fit free over the shaft and in perfect alignment therewith, and the outer surface of the rubber band will act as a ball joint and permit the bearing sleeve to adjust itself to the shaft and remain in alignment during the operation or life of the bearing.

Figure 3:
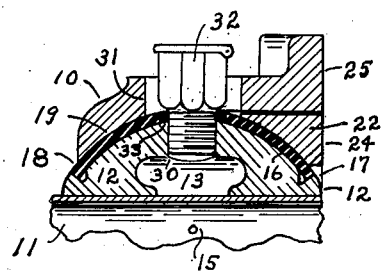
Fig. 3 is a fraction of my improved bearing taken on line 3—3 of Figure 1.

I provide a threaded opening 30 in member 12 and an opening 31 in member 10 as illustrated in Figure 3, whereby the oiling device 32 may be secured to member 12 as illustrated; I also provide an opening 33 in rubber band 18 for the free reception of this oiling device. Clearly the oiling device will not interfere with the self aligning feature of the bearing because no contact is made except with member 12.

Members 10 and 22 are shaped to terminate a short distance from flanges 17, thus to provide a gap between these members and the flanges equivalent to or slightly greater than the thickness of rubber band 18.

Thus clearly, I have provided a self aligning bearing having an insulating cushion seal between the bearing proper and its housing whereby the device is suitable for fans and air conditioning cabinets and the like. I have also provided a bearing which is very simple, and easily manufactured and safely, quickly and easily assembled, which must automatically adjust itself to the shaft at the time the bearing housing is being secured to its support.

Having thus shown and described my invention I claim:

A device of the class described, comprising a bearing having a concentrically positioned relatively long spherically shaped member on its outer surface, a relatively thin band of elastic material having a uniform thickness positioned over and adapted to cover said spherical member, an integrally formed annular housing having on its rear end a flat surface being transverse to said bearing and adapted to act as a supporting base, said housing having a spherically shaped counterbore within its front end and being adapted to embrace the front outer surface of said band but leaving a relatively narrow strip exposed at the front end thereof, an opening in said housing extending rearwardly from and concentric with the rear end of said spherically shaped counterbore and having a diameter equal to or slightly larger than the largest diameter of said band, an annular sleeve slidably mounted within said opening and having a spherically shaped counterbore concentric therewith in its front end and being adapted to embrace the rear outer surface of said band but leaving a relatively narrow strip exposed on the rear edge thereof, said annular sleeve having a length whereby when the housing is secured to its support the rear end of the sleeve will be contacted by the support and held into said housing to thereby cause said band to be snugly embraced by said spherical shaped counterbores.

FRED M. YOUNG.